(12) United States Patent
Kobilka et al.

(10) Patent No.: US 11,912,830 B2
(45) Date of Patent: Feb. 27, 2024

(54) FLAME-RETARDANT POLYDIKETOENAMINES

(71) Applicant: International Business Machines Corporation, Armonk, NY (US)

(72) Inventors: Brandon M. Kobilka, Fishkill, NY (US); Jason T. Wertz, Pleasant Valley, NY (US); Sarah K. Czaplewski-Campbell, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 17/126,239

(22) Filed: Dec. 18, 2020

(65) Prior Publication Data

US 2022/0195126 A1    Jun. 23, 2022

(51) Int. Cl.
*C08G 79/04* (2006.01)
*C08G 12/00* (2006.01)
*C08G 73/02* (2006.01)
*C08G 79/02* (2016.01)

(52) U.S. Cl.
CPC ............ *C08G 79/04* (2013.01); *C08G 12/00* (2013.01); *C08G 73/02* (2013.01); *C08G 79/02* (2013.01)

(58) Field of Classification Search
CPC ........ C08G 79/04; C08G 12/00; C08G 73/02; C08G 79/02
USPC ........................................................ 528/229
See application file for complete search history.

(56) References Cited

U.S. PATENT DOCUMENTS

| 6,716,899 B1 | 4/2004 | Klatt et al. |
| 7,521,496 B2 | 4/2009 | Tokuyasu et al. |
| 7,947,749 B2 | 5/2011 | Hasegawa et al. |
| 2003/0003317 A1 | 1/2003 | Chang et al. |
| 2020/0172668 A1 | 6/2020 | Kobilka et al. |

FOREIGN PATENT DOCUMENTS

| CN | 104892932 A | 9/2015 |
| WO | 2003068470 A1 | 8/2003 |
| WO | 2006131376 A1 | 12/2006 |
| WO | 2018080773 A1 | 5/2018 |
| WO | 2019099944 A1 | 5/2019 |
| WO | 2022127373 A1 | 6/2022 |

OTHER PUBLICATIONS

International Search Report and Written Opinion, International Application No. PCT/CN2021/125620, dated Jan. 19, 2022, 8 pgs.

(Continued)

*Primary Examiner* — David T Karst
(74) *Attorney, Agent, or Firm* — Kelsey M. Skodje

(57) ABSTRACT

A composition, method, and article of manufacture are disclosed. The composition is formed by polymerizing monomers, and includes at least one flame-retardant bis (triketone) monomer and at least one amine monomer. The method includes obtaining at least one flame-retardant bis (triketone) monomer, obtaining at least one amine monomer, and polymerizing the monomers to form a flame-retardant polydiketoenamine. The article of manufacture includes a polymer formed by polymerizing at least one flame-retardant bis(triketone) monomer and at least one amine monomer.

20 Claims, 4 Drawing Sheets

(56) References Cited

OTHER PUBLICATIONS

Moon, M., "New plastic material can by recycled again and again," Engadget, May 7, 2019, 4 pages. https://www.engadget.com/2019/05/07/pdk-plastic-circular-recyclable/.

Christensen et al., "Closed-loop recycling of plastics enabled by dynamic covalent diketoenamine bonds," Nature Chemistry, 2019, 11, pp. 442-448. https://doi.org/10.1038/s41557-019-0249-2.

Christensen et al., "Closed-loop recycling of plastics enabled by dynamic covalent diketoenamine bonds," Supplementary Information, Nature Chemistry, 2019, 41 pages.

Mo et al., "Bioaccumulation of polybrominated diphenyl ethers, decabromodiphenyl ethane, and 1,2-bis(2,4,6-tribromophenoxy) ethane flame retardants in kingfishers (*Alcedo atthis*) from an electronic waste-recycling site in South China," Environ Toxicol Chem, Sep. 2012, 31(9), pp. 2153-2158. (Abstract).

"Endlessly recyclable plastic," laboratory news, May 8, 2019, 4 pages. http://www.labnews.co.uk/article/2024811/endlessly_recyclable_plastic.

Notman, N., "Introducing mechanochemistry," Chemistry World, Jul. 16, 2018, 10 pages. https://www.chemistryworld.com/features/introducing-mechanochemistry/3009223.article#/.

Gomollon-Bel, F., "New family of polymers can be easily recycled and even upcycled," Chemistry World, Apr. 29, 2019, 4 pages. https://www.chemistryworld.com/news/new-family-of-polymers-can-be-easily-recycled-and-even-upcycled/3010439.article.

van der Veen et al., "Phosphorus flame retardants: properties, production, environmental occurrence, toxicity and analysis," Chemosphere, Aug. 2012, 88(10), pp. 1119-1153.

300

310
320

DCC/DMAP
DCM

330

FLAME-RETARDANT POLYDIKETOENAMINES

BACKGROUND

The present disclosure relates to flame-retardant polymers and, more specifically, to flame-retardant polydiketoenamines (PDKs).

Flame-retardant compounds can be added to polymers in order to provide flame retardancy. Applications for flame-retardant polymers can include plastics, foams, synthetic fibers, synthetic rubbers, etc. Flame retardants in polymers can be broadly classified according to how the flame retardants are incorporated into the polymer matrix. Additive flame retardants are mixed into polymers during blending, curing, foaming, extrusion, or other processing techniques. Reactive flame retardants are covalently bound to the polymer (e.g., bound at sites along the polymer chain, incorporated into the chain as co-monomers, and/or used as cross-linkers). Classes of flame retardants that can be additive or reactive flame retardants include organobromine compounds and organophosphorus compounds such as phosphate, phosphonate, phosphinate, phosphite, phosphonite, and phosphinate esters.

SUMMARY

Various embodiments are directed to a composition formed by polymerizing monomers, which include at least one flame-retardant bis(triketone) monomer and at least one amine monomer. Examples of amine monomers can include tris(2-aminoethyl)amine, poly(propylene glycol) bis(2-aminopropyl ether), poly(ethylene glycol) bis(2-aminopropyl ether), poly(ethylene glycol) bis(amine), dipropylenetriamine, diethylenetriamine, diaminooctane, 4,4'-oxydianiline, and combinations thereof. The at least one flame-retardant bis(triketone) monomer can be an organophosphorus compound or an organobromine compound. The monomers can also include at least one non-flame-retardant bis(triketone) monomer. In some embodiments, at least one flame-retardant bis(triketone) monomer is derived from a dicarboxyl flame retardant. The amine monomer can have at least two primary amine groups.

Additional embodiments are directed to a method that includes obtaining at least one flame-retardant bis(triketone) monomer, obtaining at least one amine monomer, and polymerizing the monomers to form a flame-retardant polydiketoenamine. The polymerization can take place in a ball mill. Examples of amine monomers can include tris(2-aminoethyl)amine, poly(propylene glycol) bis(2-aminopropyl ether), poly(ethylene glycol) bis(2-aminopropyl ether), poly(ethylene glycol) bis(amine), dipropylenetriamine, diethylenetriamine, diaminooctane, 4,4'-oxydianiline, and combinations thereof. The at least one flame-retardant bis(triketone) monomer can be an organophosphorus compound or an organobromine compound. Obtaining the flame-retardant bis(triketone) monomer can include reacting a dicarboxyl flame retardant with a diketone compound, such as a 1,3-diketone. The method can also include obtaining at least one non-flame-retardant bis(triketone) monomer, and including it in the polymerization.

Further embodiments are directed to an article of manufacture that includes a polymer formed by polymerizing at least one flame-retardant bis(triketone) monomer and at least one amine monomer. The at least one flame-retardant bis(triketone) monomer can be an organophosphorus compound or an organobromine compound. In some embodiments, at least one flame-retardant bis(triketone) monomer is derived from a dicarboxyl flame retardant. The amine monomer can have at least two primary amine groups.

DETAILED DESCRIPTION

Figure 1:
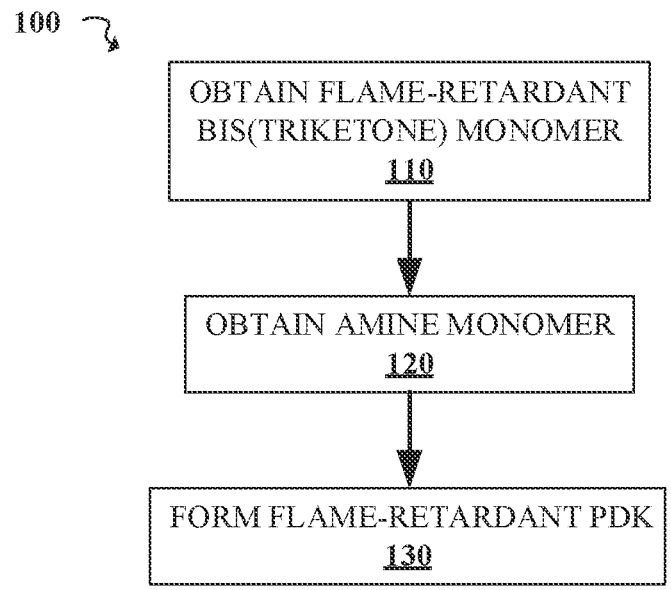
FIG. 1 is a flow diagram illustrating a process of forming a flame-retardant polydiketoenamine (PDK), according to some embodiments of the present disclosure.

Flame retardants are added to a wide variety of materials in order to ensure safety and protect the materials from damage. Examples of materials that often include flame-retardant additives include plastics, paints, coatings, foams, adhesives, synthetic fibers, acoustic dampening materials, insulation, and synthetic rubbers.

Flame retardants commonly used in the aforementioned applications include organophosphorus compounds such as organophosphates, organophosphonates, organophosphinates, organophosphites, and organophosphonites. Organobromine compounds ("brominated flame retardants") are also used as flame retardants. Examples of these can include tetrabromobisphenol-A, hexabromocyclododecane, and bromodiphenyl ethers. Flame retardants can be additive or reactive. Reactive flame retardants include functional groups capable of forming covalent bonds at one or more sites in a polymer matrix, being incorporated into the chain as comonomers, and/or being used as cross-linkers. Additive flame retardants are blended into polymers without binding.

An advantage of reactive flame retardants is that they do not leach out of materials as easily as additive flame retardants. Flame retardants leaching out of materials can lead to bioaccumulation of the flame retardants and a reduction in flame retardancy over time. It has been necessary to reduce or eliminate the use of many additive flame retardants due to their potential for bioaccumulation, environmental persistence, and toxicity. Therefore, new reactive flame retardants are needed to replace additive flame retardants in polymer applications.

Recyclable plastics made of polydiketoenamines (PDKs) and similar polymers, such as polytriketoenamines (PTKs), are of interest because they are formed in reversible polymerization reactions. PDKs are formed by polymerizing triketones and aromatic or aliphatic amines. The polymerization reaction results in dynamic covalent diketoenamine bonds, yielding only water as a byproduct. These polymers can be easily converted back to the triketone and amine monomers (e.g., using concentrated acids). Further, the polymerization and reverse polymerization can take place at room temperature without catalysts, solvents, or additives. The recovered monomers can be used to re-manufacture the same polymers without the loss of performance typically found in conventional recycled plastics. The PDK monomers can also be used in other formulations to produce polymers having different properties.

However, recovery of PDK monomers can be complicated by the presence of other species bound to the polymer matrix. For example, bonds between these compounds and the polymer chain may not be reversible under the same conditions as the polymer itself. Further, when the bonds are broken, it can be difficult to recover and recycle the PDK monomers in the presence of other the other compounds. Disclosed herein are flame-retardant PDKs formed from amine and flame-retardant bis(triketone) monomers. Rather than adding flame retardants to PDK, flame retardant organophosphorus or organobromine bis(triketone) monomers are formed, and polymerized with di-, tri-, and/or polyamine monomers to form the flame-retardant PDK. The flame-retardant PDK can be recycled by reversing the polymerization and recovering the monomers.

Figure 2:
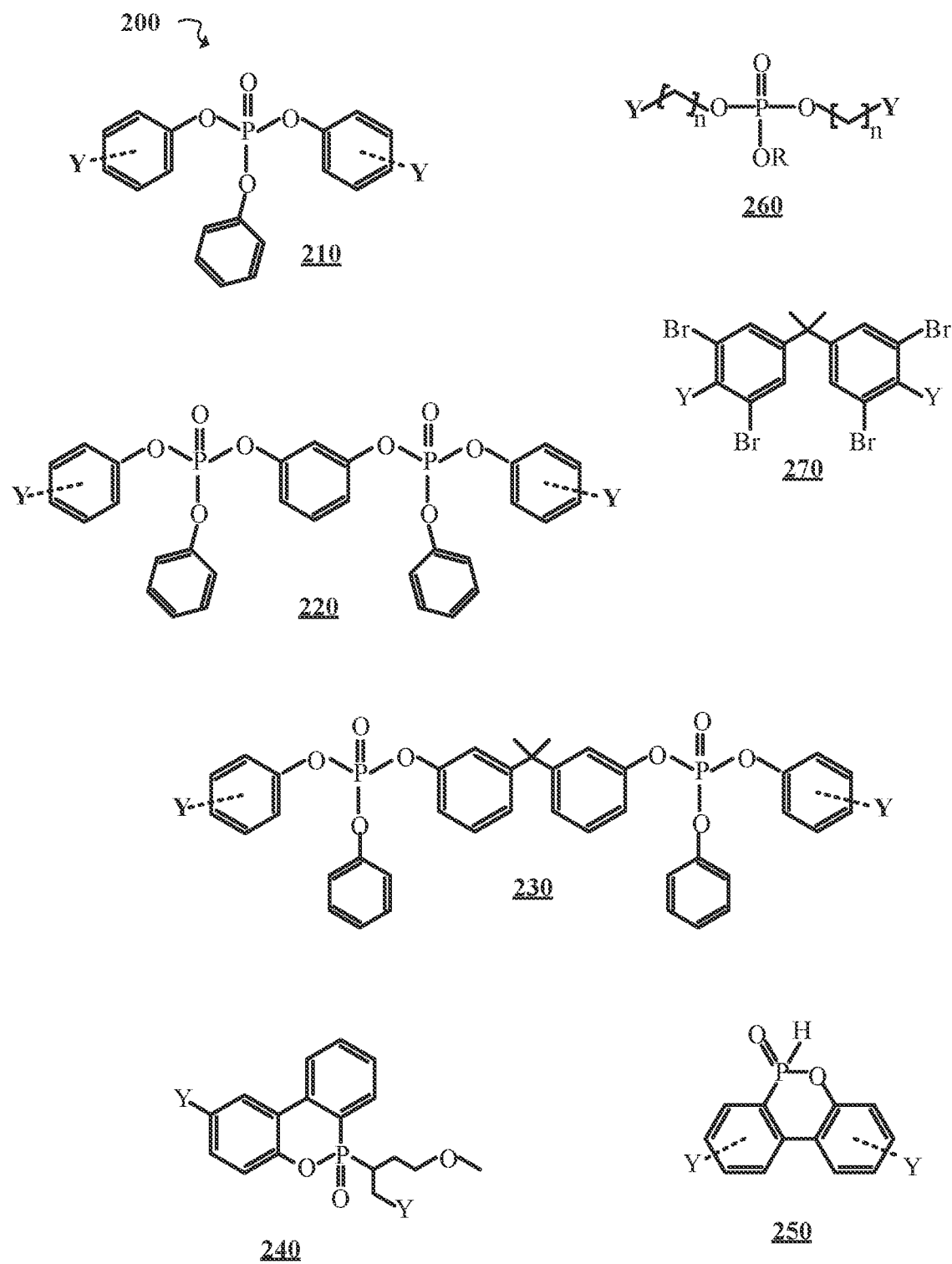
FIG. 2 is a chemical structure diagram illustrating dicarboxylic acid-functionalized flame retardants, according to some embodiments of the present disclosure.
Figure 3:
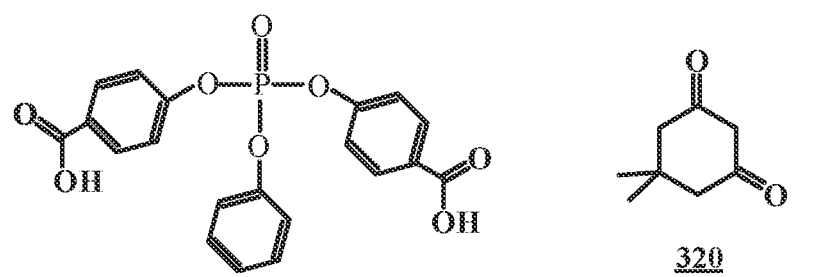
FIG. 3 is a chemical reaction diagram illustrating a process of forming a flame-retardant bis(triketone) monomer, according to some embodiments of the present disclosure.
Figure 3:
Figure 3:
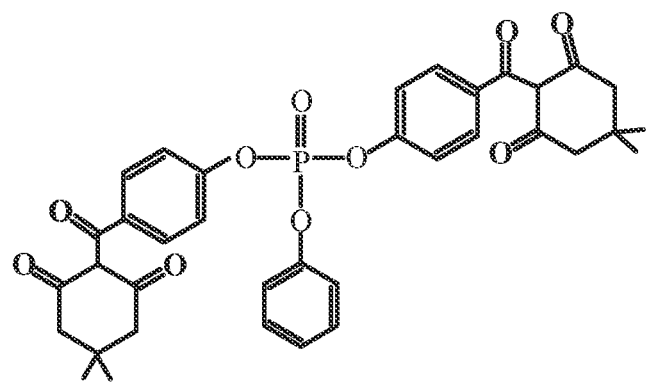

FIG. 1 is a flow diagram illustrating a process 100 of forming a flame-retardant PDK, according to some embodiments of the present disclosure. A flame-retardant bis(triketone) monomer is obtained. This is illustrated at step 110. Herein, flame-retardant bis(triketone) monomers are also referred to as "bis(triketone) flame retardants". The bis(triketone) flame retardants can be obtained by reacting dicarboxylic acid-functionalized derivatives of organophosphorus or organobromine flame retardants ("dicarboxyl flame retardants") with diketones (e.g., cyclic 1,3-diketones). The reactions can be carried out using any appropriate reagents and reaction conditions for binding a diketone at each carboxyl group to form a bis(triketone) monomer. Examples of dicarboxyl flame retardants that can be used are illustrated in FIG. 2. An example of a reaction for forming bis(triketone) flame retardants is illustrated in FIG. 3. In some embodiments, more than one type of bis(triketone) flame retardant is obtained at step 110. This is discussed in greater detail below.

An amine monomer having two or more primary amine groups is then obtained. This is illustrated at step 120. Herein, "amines" or "amine monomers" refers to diamines, triamines, polyamines, and combinations thereof, unless otherwise specified. In some embodiments, the amine selected is tris(2-aminoethyl)amine (TREN). However, any appropriate aliphatic or aromatic amine monomer having at least two amine groups can be used. Examples of these amines can include poly(propylene glycol) bis(2-aminopropyl ether), poly(ethylene glycol) bis(2-aminopropyl ether), poly(ethylene glycol) bis(amine), dipropylenetriamine, diethylenetriamine, diaminooctane, 4,4'-oxydianiline, etc. In some embodiments, more than one type of amine is obtained in process 100. For example, the amine monomers can be a mixture of TREN and 4,4'-oxydianiline.

The bis(triketone) flame retardant and amine monomer are reacted to form a flame-retardant PDK. This is illustrated at step 130. In some embodiments, more than one type of amine monomer and/or more than one type of bis(triketone) flame retardant monomer are included in the polymerization. The polymerization can be carried out by mechanically grinding selected quantities of the monomers in a ball mill. In these instances, the reaction can take place at room temperature in the absence of organic solvent. However, the polymerization can be carried out via other techniques in some embodiments, such as in solution while stirring at room temperature. Techniques for forming the flame-retardant PDK are discussed in greater detail with respect to FIG. 4.

Properties of the flame-retardant PDK can be tuned by varying the components and conditions of the polymerization reaction at step 130. For example, the type and quantity of amine monomers can be varied, as can the type and quantity of bis(triketone) flame retardants. Additionally, bis(triketone) monomers that are not flame-retardant can be added to the reaction mixture in order to form copolymers (e.g., terpolymers) with amine repeat units, flame-retardant repeat units, and non-flame retardant ketone repeat units (see below). Additional monomers and/or additives that can be added (e.g., during ball milling or solvent-based reactions, additional processing steps, etc.) can include any appropriate polymer additives/components known to those of ordinary skill in the art (e.g., crosslinkers, dyes, pigments, plasticizers, stabilizers, etc.).

In some embodiments, the flame-retardant PDK formed in step 130 can be reacted with a strong acid. This reverse polymerization reaction is not illustrated herein. A reaction between flame-retardant PDK and a strong acid (e.g., sulfuric acid, hydrochloric acid, nitric acid, etc.) reverses the polymerization reaction, and the monomers obtained at steps 110 and 120 can be recovered. This monomer-recovery reaction can be carried out at room temperature, and the monomers can be used to form new materials (e.g., flame-retardant PDKs, other PDKs, other polymers and compounds, etc.). In other embodiments, the flame-retardant PDK is not reacted with a strong acid.

FIG. 2 is a chemical structure diagram 200 illustrating dicarboxylic acid-functionalized flame retardants, according to some embodiments of the present disclosure. Each dicarboxylic acid-functionalized flame retardant ("dicarboxyl flame retardant") includes two carboxyl substituents (Y). Phenyl-Y bonds represented by dashed lines to the centers of phenyl rings indicate that the carboxyl substituents can be bound at any available position on their respective phenyl rings (e.g., .meta, ortho, or para). Herein, "carboxyl substituent" can refer to a carboxyl group (—COOH) or another substituent that includes an alkyl (R) group and a carboxyl group. In some embodiments Y is a substituent such as —ORCOOH or —RCOOH, For example, Y can be a substituent such as —O(CH$_2$)$_n$COOH, —O(C$_6$H$_4$)COOH, —(CH$_2$)$_n$COOH, etc., where n is an integer greater than or equal to 1). The R groups can include linear alkyl groups, branched alkyl groups, cyclic alkyl groups, aromatic groups, etc. In some embodiments, the R groups can include heteroatoms. Examples of alkyl groups that can be included in the carboxyl substituents are discussed in greater detail below.

In some embodiments, the dicarboxyl flame retardant is a dicarboxyl derivative of triphenyl phosphate 210 or tritolyl phosphates such as tri-o-tolyl phosphate and/or tri-m-tolyl phosphate (not shown). The dicarboxyl flame retardants can also include dicarboxyl derivatives of resorcinol bis(diphenyl phosphate) 220; dicarboxyl derivatives of bisphenol A bis(diphenyl phosphate) 230; pentanedioic acid, 3-(2-carboxy-6-oxido-6H-dibenz[c,e][1,2]oxaphosphorin-6-yl)-1-methyl ester 240 (when Y=—COOH) or analogous compounds where Y=—RCOOH; dicarboxyl derivatives of 6H-dibenz[c,e][1,2]oxaphosphorin-6-oxide 250; dicarboxyl derivatives of trialkyl phosphates 260 where n is an integer greater than or equal to 1, etc.

In addition to the illustrated organophosphate compounds, the dicarboxyl flame retardants can include analogous dicarboxyl derivatives of organophosphonates, organophosphinates, organophosphites, and organophosphonites in some embodiments. Further, the dicarboxyl flame retardants can include various flame-retardant organobromine compounds, such as dicarboxyl derivatives of tetrabromobisphenol-A 270 or other brominated flame retardants. Examples of brominated flame retardants that may be used are discussed in greater detail above. In some embodiments, carboxyl flame retardants having more than two carboxyl groups can be used.

FIG. 3 is a chemical reaction diagram illustrating a process 300 of forming a flame-retardant bis(triketone) monomer, according to some embodiments of the present disclosure. A dichloromethane (DCM) solution of dimedone 320 and a triphenyl phosphate dicarboxyl flame retardant 310 is prepared. A mixture of N,N'-dicyclohexylcarbodiimide (DCC) and 4-dimethylaminopyridine (DMAP) is then added to the solution. The resulting mixture is allowed to react at room temperature (e.g., about 25° C.). In some embodiments, the reaction mixture is stirred for about 10 minutes, although any appropriate amount of time can be selected for the reaction (e.g., until the reaction is determined to be complete). The reaction results in formation of a triphenyl phosphate bis(triketone) flame retardant 330.

While the illustrated triphenyl phosphate bis(triketone) flame retardant 330 is derived from the triphenyl phosphate dicarboxyl flame retardant 310, other dicarboxyl flame retardants can be used in process 300 (e.g., dicarboxyl flame retardants illustrated FIG. 2). Further, alternative diketones (e.g., other cyclic diketones, 1,3-diketones, etc.) can replace dimedone 320 in some embodiments. The resulting reactions can produce bis(triketone) flame retardants analogous to the illustrated bis(triketone) flame retardant 330, depending on the selection of dicarboxyl flame retardant and diketone. For example, process 300 can be carried out with a dicarboxyl tetrabromobisphenol A 270 (FIG. 2) and dimedone 320, resulting in a bis(triketone) brominated flame retardant (not shown).

Figure 4:
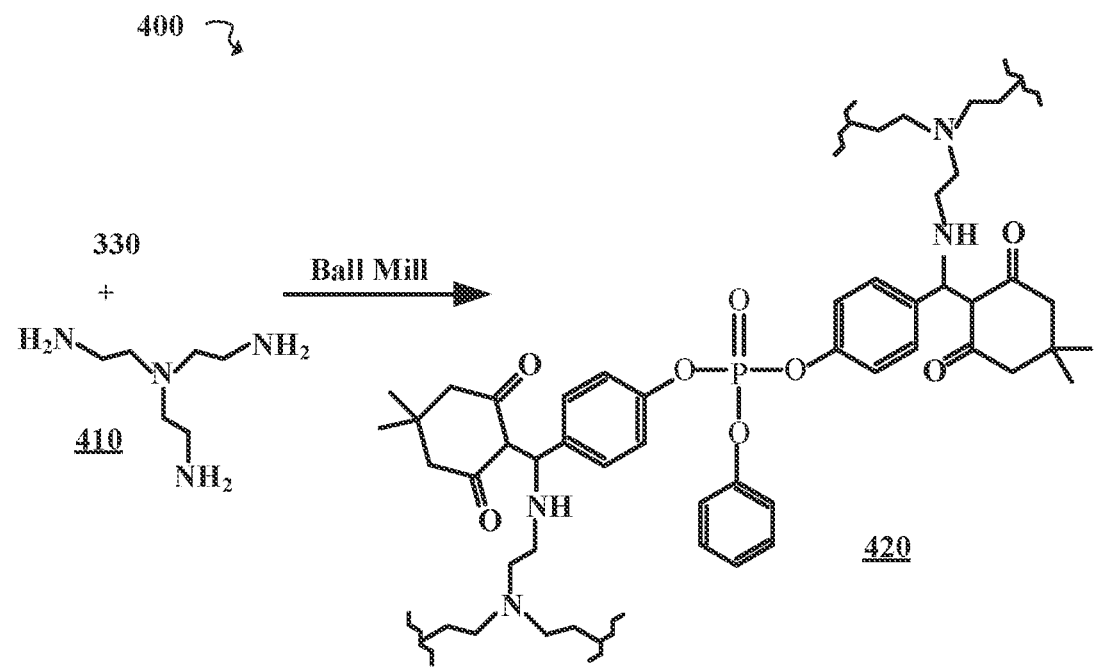
FIG. 4 is a chemical reaction diagram illustrating a process of forming a flame-retardant PDK, according to some embodiments of the present disclosure.

FIG. 4 is a chemical reaction diagram illustrating a process 400 of forming a flame-retardant PDK, according to some embodiments of the present disclosure. In process 400, the triphenyl phosphate bis(triketone) flame retardant 330 (FIG. 3) and TREN 410 are reacted in a ball mill, which mechanically grinds the monomers together, resulting in formation of flame-retardant PDK 420. This solvent-free polymerization reaction can be carried out at room temperature. The flame-retardant PDK 420 includes at least two flame-retardant repeat units and at least two TREN repeat units. The number of repeat units can depend on the quantity of monomers and the polymerization reaction time. For example, the number of each repeat unit can be an integer between 2 and 1,000,000 (e.g., about 2-25,000, about 500-25,000, about 1,000-25,000, about 2,000-25,000, about 5,000-25,000, about 25,000-50,000, about 50,000-500,000, etc.). In FIG. 4, bonds between TREN nitrogen atoms and additional flame retardant repeat units are represented by wavy lines.

Flame-retardant PDK can be formed using techniques other than ball milling in some embodiments. For example, a bis(triketone) flame retardant (e.g., triphenyl phosphate bis(triketone) flame retardant 330) can be dissolved in dimethylformamide (DMF), and stirred at room temperature. TREN 410 and/or another di-, tri-, or polyamine can then be added to the solution, resulting in formation of a viscous solution. The viscous solution can be heated (e.g., to about 110° C.) while stirring in an open container to allow water evaporation. In some embodiments, these reaction conditions are maintained for about one hour, although the time can vary. The reaction mixture can then be cooled to room temperature, purified (e.g., by diluting the mixture in dichloromethane and precipitating the polymer product from diethyl ether), and dried.

Additionally, process 400 can be carried out to form a variety of flame-retardant PDKs by polymerizing other dicarboxyl flame retardants and/or amines. For example, the bis(triketone) flame retardant 330 illustrated in FIG. 4 can be replaced by other bis(triketone) flame retardants. Examples of other bis(triketone) flame retardants that can be used are discussed in greater detail with respect to FIG. 3. Additionally, TREN 410 can be replaced by or combined with other di-, tri-, or polyamines. Examples of amines that can be used are discussed in greater detail with respect to FIG. 1. Further, other bis(triketone) monomers can be included in the polymerization with the bis(triketone) flame retardant 330 and the TREN 410. For example, a flame-retardant terpolymer can be formed from a mixture of the bis(triketone) flame retardant 330, TREN 410, and a bis(triketone) monomer (not shown) produced by reacting a diketone with a dicarboxylic acid such as adipic acid, suberic acid, sebacic acid, etc. These non-flame-retardant bis(triketone) monomers can be formed under reaction conditions such as those of process 300 (FIG. 3).

In addition to the compounds and reactions discussed with regard to FIGS. 1-4, organophosphorus and organobromine bis(triketone) flame-retardant monomers having other functional groups and structures can be formed, and reacted with di-, tri-, and/or polyamines to form flame-retardant PDKs. For example, bis(triketone) flame retardants and/or amines can be formed with additional moieties such as epoxides, hydroxyl, propylene carbonate, alkyl halides, esters, alkynes, amines, isocyanates, acid chlorides, chloroformates, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

Additional examples of moieties that may be included in the compounds illustrated herein can include substituted analogues of cyclic alkyl groups. When cyclic, the alkyl groups can be aromatic or non-aromatic. Herein, the term "aromatic" also refers to pseudoaromatic heterocycles, which are heterocyclic substituents that have similar properties and structures (nearly planar) to aromatic heterocyclic ligands, but are not by definition aromatic. Examples of cyclic aromatic alkyls that can be used can include six-carbon aromatic rings (phenyl) and substituted variants thereof (e.g. 2-methyl-phenyl, xylyl, tolyl, etc.), $C_4$-$C_{60}$ aromatic rings, $C_4$-$C_{20}$ aromatic rings, etc. The cyclic groups can optionally include heteroatoms (e.g., nitrogen, oxygen, or sulfur) replacing at least one carbon atom in the cyclic structure.

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate flame-retardant polydiketoenamines. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may form the bis(triketone) flame retardants, and a second entity may carry out the polymerization processes.

What is claimed is:

1. A composition formed by polymerizing monomers, the monomers comprising:
   at least one flame-retardant bis(triketone) monomer comprising a phosphoryl group; and
   at least one amine monomer.

2. The composition of claim 1, wherein the at least one amine monomer is selected from the group consisting of tris(2-aminoethyl)amine, poly(propylene glycol) bis(2-aminopropyl ether), poly(ethylene glycol) bis(2-aminopropyl ether), poly(ethylene glycol) bis(amine), dipropylenetriamine, diethylenetriamine, diaminooctane, 4,4'-oxydianiline, and combinations thereof.

3. The composition of claim 1, wherein the at least one flame-retardant bis(triketone) monomer is an organophosphorus compound selected from the group consisting of organophosphates, organophosphonates, organophosphinates, organophosphites, and organophosphonites.

4. The composition of claim 1, wherein the monomers further comprise at least one non-flame-retardant bis(triketone) monomer.

5. The composition of claim 1, wherein the at least one flame-retardant bis(triketone) monomer is derived from a dicarboxyl flame retardant.

6. The composition of claim 1, wherein the at least one amine monomer has at least two primary amine groups.

7. A method, comprising:
   obtaining at least one flame-retardant bis(triketone) monomer comprising a phosphoryl group;
   obtaining at least one amine monomer; and
   polymerizing the at least one flame-retardant bis(triketone) monomer and the at least one amine monomer to form a flame-retardant polydiketoenamine.

8. The method of claim 7, wherein the polymerizing is carried out in a ball mill.

9. The method of claim 7, wherein the at least one amine monomer is selected from the group consisting of tris(2-aminoethyl)amine, poly(propylene glycol) bis(2-aminopropyl ether), poly(ethylene glycol) bis(2-aminopropyl ether), poly(ethylene glycol) bis(amine), dipropylenetriamine, diethylenetriamine, diaminooctane, 4,4'-oxydianiline, and combinations thereof.

10. The method of claim 7, wherein the at least one flame-retardant bis(triketone) monomer is an organophosphorus compound selected from the group consisting of organophosphates, organophosphonates, organophosphinates, organophosphites, and organophosphonites.

11. The method of claim 7, wherein the obtaining the at least one flame-retardant bis(triketone) monomer comprises reacting a dicarboxyl flame retardant with a diketone compound.

12. The method of claim 11, wherein the diketone compound is a 1,3-diketone.

13. The method of claim 11, wherein the dicarboxyl flame retardant has the following structure:

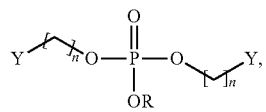

wherein:
   each Y is a substituent comprising a carboxyl group;
   R is an organic substituent; and
   n is an integer greater than or equal to 1.

14. The method of claim 7, further comprising:
   obtaining at least one non-flame-retardant bis(triketone) monomer; and
   including the at least one non-flame-retardant bis(triketone) monomer in the polymerizing.

15. The method of claim 7, wherein the polymerizing forms a flame-retardant polydiketoenamine (PDK).

16. The method of claim 7, wherein the flame-retardant bis(triketone) monomer has the following structure:

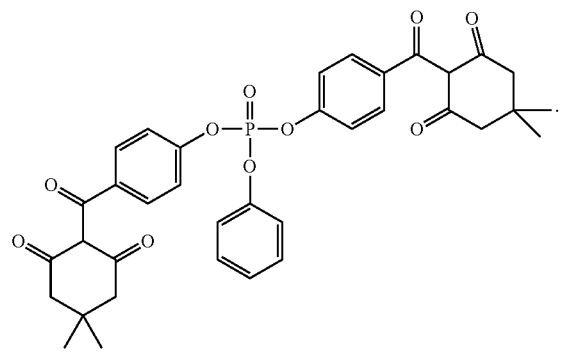 [SMILES: CC1(C)CC(=O)C(C(=O)c2ccc(OP(=O)(Oc3ccccc3)Oc3ccc(C(=O)C4C(=O)CC(C)(C)CC4=O)cc3)cc2)C(=O)C1]

17. An article of manufacture, comprising:
a flame-retardant polymer formed by polymerizing monomers, the monomers comprising:
at least one flame-retardant bis(triketone) monomer comprising a phosphoryl group; and
at least one amine monomer.

18. The article of manufacture of claim 17, wherein the at least one flame-retardant bis(triketone) monomer is an organophosphorus compound selected from the group consisting of organophosphates, organophosphonates, organophosphinates, organophosphites, and organophosphonites.

19. The article of manufacture of claim 17, wherein the at least one amine monomer has at least two primary amine groups.

20. The article of manufacture of claim 17, wherein the at least one flame-retardant bis(triketone) monomer is derived from a dicarboxyl flame retardant.

* * * * *